United States Patent [19]

Simpson et al.

[11] Patent Number: 5,772,847
[45] Date of Patent: Jun. 30, 1998

[54] METHOD FOR FORMING PULP FROM PROCESSED RECYCLED FIBERS

[75] Inventors: Carl W. Simpson, Gig Harbor; Raymond Lam, Tacoma, both of Wash.

[73] Assignee: Stone-Consolidated (US) Corporation, Steilacoom, Wash.

[21] Appl. No.: 547,508

[22] Filed: Oct. 24, 1995

[51] Int. Cl.$^6$ .................. D21F 1/66; C02F 1/52
[52] U.S. Cl. ............... 162/189; 162/181.1; 162/DIG. 9; 210/712; 210/928
[58] Field of Search .................. 162/6, 5, 189, 162/190, DIG. 9, 181.1; 210/712, 787, 928

[56] References Cited

U.S. PATENT DOCUMENTS

| | | |
|---|---|---|
| 3,188,751 | 6/1965 | Sutton ............................. 162/DIG. 9 |
| 3,320,076 | 5/1967 | Sutton ............................. 162/DIG. 9 |
| 3,765,921 | 10/1973 | Puskar .............................. 106/288 B |
| 3,849,245 | 11/1974 | Marsh et al. . |
| 3,876,497 | 4/1975 | Hoffman . |
| 3,884,755 | 5/1975 | Frost, III . |
| 4,030,968 | 6/1977 | Goel et al. . |
| 4,303,019 | 12/1981 | Haataja et al. . |
| 4,481,072 | 11/1984 | Grudinin et al. . |
| 4,983,258 | 1/1991 | Maxham ................................ 162/189 |
| 5,002,633 | 3/1991 | Maxham . |
| 5,013,404 | 5/1991 | Christiansen et al. .................... 162/72 |
| 5,137,599 | 8/1992 | Maxham . |
| 5,215,625 | 6/1993 | Burton . |
| 5,290,454 | 3/1994 | Dorica et al. . |
| 5,354,427 | 10/1994 | Rasmussen . |
| 5,384,010 | 1/1995 | Hou et al. .................................. 162/5 |
| 5,478,441 | 12/1995 | Hamilton .............................. 162/189 |
| 5,496,441 | 3/1996 | Tran ..................................... 162/181.3 |
| 5,593,542 | 1/1997 | Wolfer et al. .............................. 162/4 |

FOREIGN PATENT DOCUMENTS

| | | |
|---|---|---|
| 440468 | 5/1972 | U.S.S.R. . |
| 240924 | 10/1925 | United Kingdom . |

*Primary Examiner*—Donald E. Czaja
*Assistant Examiner*—Steven B. Leavitt
*Attorney, Agent, or Firm*—Klarquist Sparkman Campbell Leigh & Whinston, LLP

[57] ABSTRACT

A method for processing recycling mill sludge into pulp, and cellulosic products made from such pulp, is described. The method for forming cellulosic pulp comprises first forming an aqueous composition in a pulper comprising recycling mill sludge, caustic agent, bleaching agent and a chelating agent. The aqueous composition also preferably includes a deinking agent and sodium silicate. The composition is then processed in the pulper for a period of time sufficient to form pulp from recycling mill sludge. The disclosure also describes a method for forming cellulosic products. The method comprises forming a cellulosic pulp from recycling mill sludge, and thereafter forming cellulosic products from the pulp. The method for forming cellulosic products may further comprise forming a pulp mixture comprising from about 1 to about 40 percent pulp from recycled materials and recycling mill sludge, and from about 99 to about 60 percent virgin pulp. The pulp from recycled materials and recycling mill sludge may comprise from about 1 to about 100 percent by weight pulp from recycling mill sludge, with any remaining portion of the pulp mixture comprising pulp produced from post-consumer recycled material.

40 Claims, 2 Drawing Sheets

METHOD FOR FORMING PULP FROM PROCESSED RECYCLED FIBERS

FIELD OF THE INVENTION

This invention concerns a method for forming cellulosic products from processed recycled fibers, currently a waste by-product of recycling mills that is discarded in landfills or burned.

BACKGROUND OF THE INVENTION

Industries making cellulosic products, particularly the paper industry, have experienced increased production costs. This is primarily because the cost of raw materials has significantly increased in recent years. The cellulosic products industry also is concerned with the environmental impact associated with producing cellulosic products. For instance, recycling plants now routinely process tons of paper products that are recycled by the consumer (i.e., post-consumer waste products). These recycling plants produce cellulosic pulp from the post-consumer waste, which is then used to produce new cellulosic products. The recycling process produces a by-product that is referred to herein as processed recycled fibers, or PRF. The cellulosic products industry has heretofore concluded that PRF is not a viable source of cellulosic material useful for preparing new paper products, and therefore has no economic value. PRF therefore is discarded in landfills or burned.

PRF may be referred to by those in the industry as "sludge." This can be confusing because "sludge" also designates waste from plants that produce paper products from natural sources of fiber, i.e. first-generation products that are produced from wood chips and the like. Wood chips obviously do not include inks and fillers, which are present in recycled paper products. As a result, PRF has a significantly different composition than the sludge produced by first-generation pulp plants. Moreover, PRF has significantly higher concentrations of heavy metals, such as higher concentrations of aluminum, chromium, magnesium, manganese and iron, than are found in sludge. Hereinafter, the waste byproduct of PRF also may be further contaminated by materials found in the landfills in which it is disposed.

Prior to the present invention, no one is known to have found a commercial use for PRF. In particular, PRF has been universally regarded as unsuitable for use in the production of cellulosic products.

Products have been produced using the sludge from paper mills. For instance, Maxham's U.S. Pat. Nos. 4,983,258 and 5,002,633, describe continuous processes for converting such sludge into new paper products. Furthermore, Grudinin's U.S. Pat. No. 4,481,072 concerns a method for recovering wastewater sludge from paper mills, which is collected and used to produce cardboard and wood-fibre board. None of these sludge processes, however, have been found suitable for use in processing PRF into a useful cellulosic product.

Accordingly, with the high demand for paper products, the high cost of producing paper, the diminishing availability of first-generation fiber for producing paper products, the undesirable environmental impact of disposing of PRF in landfills or by burning, applicants have realized that there is a need for finding an economic use for PRF, especially in the paper industry.

SUMMARY OF THE INVENTION

The present invention satisfies the foregoing need by providing a process for making pulp suitable for the production of paper products using PRF.

More particularly, the present invention provides a method for processing PRF, with or without other post-consumer waste paper, into pulp, and ultimately into new cellulosic products. The method comprises first forming an aqueous mixture in a pulper, the mixture comprising: PRF, and perhaps other cellulosic material such as old newspapers (ONP) and/or old magazines (OMG); from about 0 (for pulp containing one-hundred percent PRF) to about 1.25 weight percent caustic agent, preferably at least 1 weight percent caustic agent when processing OMG or ONP along with the PRF; from about 0.5 to about 1.3 percent bleaching agent, preferably at least 1 weight percent bleaching agent for processing PRF; and from about 0.3 to about 1.3 weight percent chelating agent, preferably at least 1.0 percent chelating agent, when processing PRF. The aqueous mixture also generally includes a deinking agent and sodium silicate, and may include a biocide, particularly biocides for catalase-producing microorganisms.

Without limitation, the chelating agent generally is selected from the group consisting of aminocarboxylic acids, salts of aminocarboxylic acids, hydroxycarboxylic acids, salts of hydroxycarboxylic acids, aminophosphonic acids, salts of aminophosphonic acids, and mixtures thereof. Current working embodiments of the invention generally use diethylenetriaminepentacetic acid as the chelating agent; sodium hydroxide as the caustic agent; hydrogen peroxide as the bleaching agent; and nonionic deinking agents, such as Lion Industries 779 and LIPTOL S 100. The mixture is processed in the pulper for a period of time sufficient to form PRF pulp or pulp mixtures containing PRF, such as from about 10 to about 25 minutes.

The invention also provides a method for forming cellulosic products. The method comprises forming a cellulosic pulp from PRF as discussed above, and thereafter forming cellulosic products from the pulp. Newsprint, having a brightness of 60±2 ISO, is one example, without limitation, of a product that has been made using PRF pulp.

The method for forming cellulosic products may further comprise first forming a pulp mixture that comprises about 40 percent pulp that is derived from PRF and recycled materials such as ONP and OMG, and about 60 percent virgin pulp. The pulp from recycled materials and PRF may comprise from about 1 to about 100 percent by weight PRF pulp, with any remaining portion of the pulp mixture comprising pulp produced from post-consumer recycled material. For instance, the method may comprise pulping OMG and PRF together to form the cellulosic pulp, or it may comprise pulping ONP and PRF together to form the cellulosic pulp.

Moreover, the method may comprise (1) processing OMG and PRF to form an OMG pulp, (2) processing ONP and PRF to form an ONP pulp, and (3) blending the OMG pulp and the ONP pulp to form a pulp mixture prior to the step of forming cellulosic products.

An object of the present invention is to provide a use for PRF.

Another object of the invention is to provide a method for forming useful cellulosic pulp from PRF.

Another object of the present invention is to provide cellulosic products that are made from pulp derived from PRF.

Still another object of the present invention is to provide newsprint made using PRF, the newsprint having a brightness of about 60±2 ISO.

DETAILED DESCRIPTION OF THE PREFERRED EMBODIMENTS

The present invention provides a method for producing cellulosic products, particularly newsprint, using PRF. Known methods for producing newsprint typically use a pulp mixture that includes pulp made from wood chips, or the like, and pulp made from recycled materials, such as ONP and OMG. Some states now require that a fraction of the pulp used to make newsprint be produced from recycled materials. As a result, the pulp used to make newsprint according to the method of the present invention generally comprises PRF pulp and pulp made using other feed materials, such as ONP, OMG and/or wood-chip pulp. However, the present invention also concerns cellulosic products that are made entirely from PRF pulp.

Figure 1:
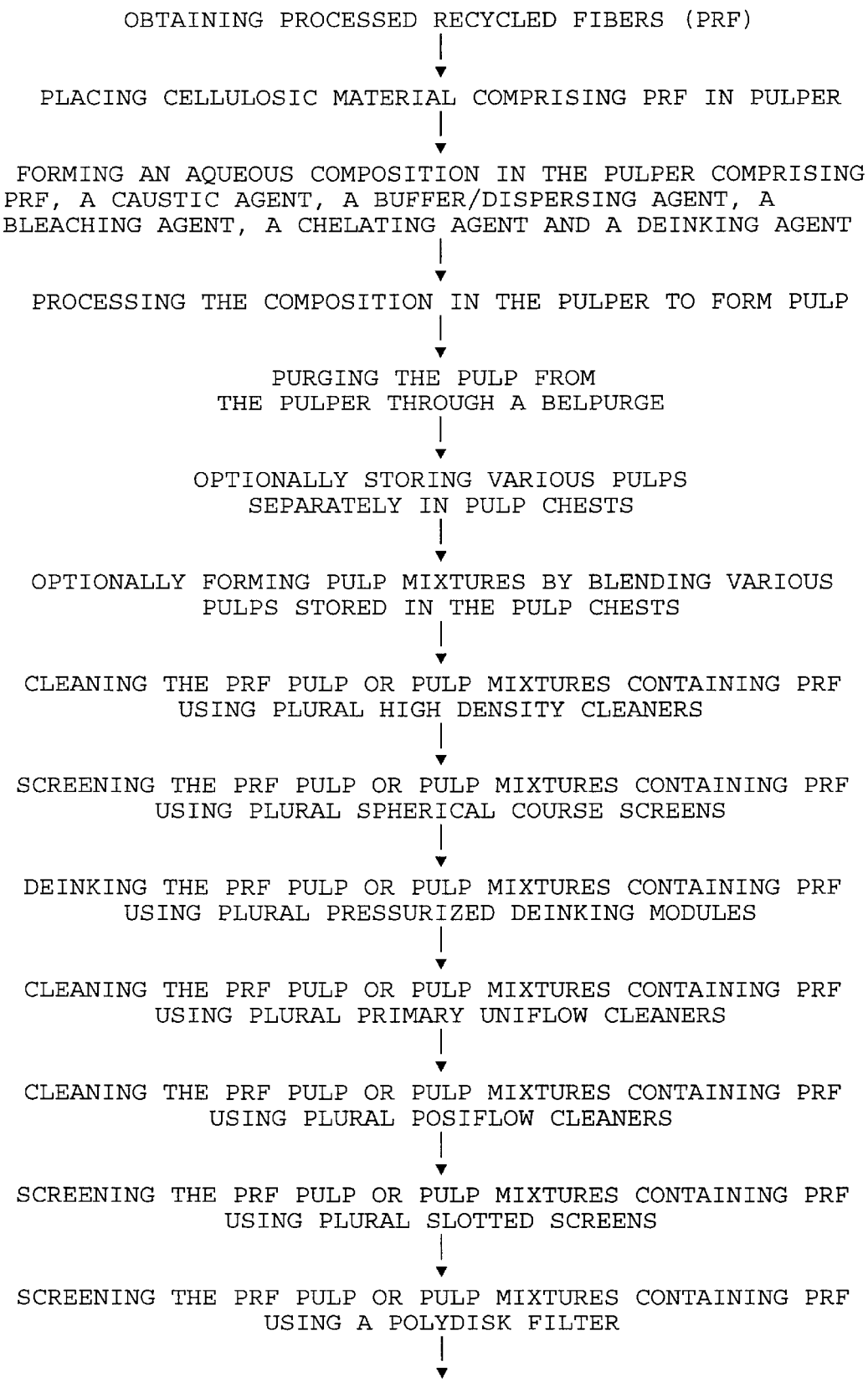
FIG. 1 is a flow chart which lists certain process steps used to practice the methods and produce the products of the present invention.
Figure 1:
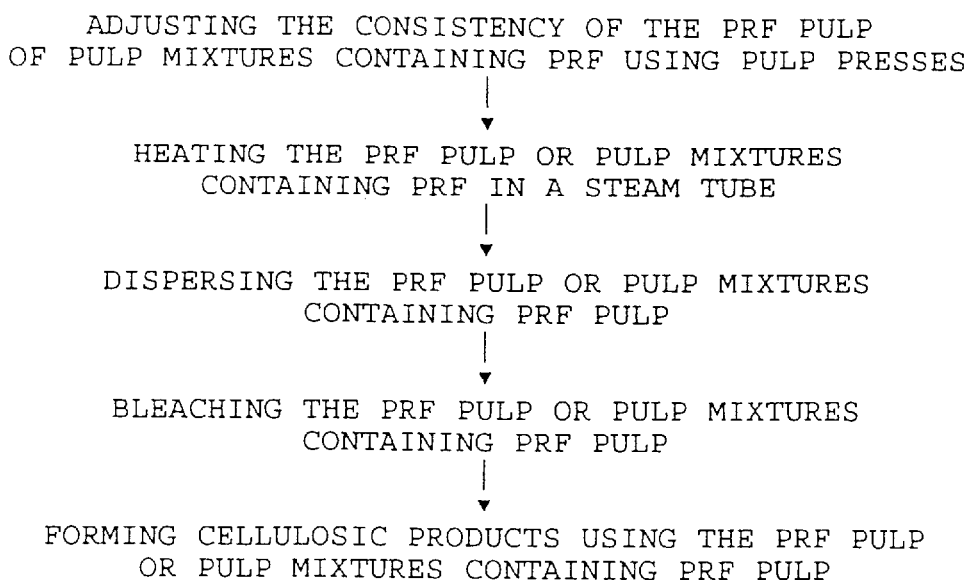

The method steps illustrated in FIG. 1 for practicing the present invention are discussed below. In general, the method comprises first obtaining PRF and forming an aqueous composition in a pulper comprising PRF. PRF can be processed into a pulp in the pulper separately from other cellulosic materials, or it can be processed along with other sources of cellulosic material, such as OMG or ONP. However, ONP and OMG generally are processed in the pulper. Thus, either PRF is processed in the pulper, or mixtures of (1) ONP and PRF or (2) OMG and PRF are processed in the pulper. This allows an operator to optimize the chemistry required for processing these sources of cellulosic material. Pulps formed from each source of cellulosic material are processed in the pulper, purged from the pulper and stored separately in pulp storage chests. Various pulp mixtures used to produce cellulosic products can be formed by combining pulps derived from different sources that have been stored in the chests. These pulp mixtures are then fed through a series of screens, cleaning procedures and presses to obtain a pulp that is suitable for further use in the production of cellulosic products.

I. PRODUCTION OF PRF PULP

A. Feed Material for Pulper

Cellulosic products are made according to the present invention using PRF pulp, and pulp comprising PRF and other materials, particularly OMG and ONP. First-generation pulp, such as pulp made from wood chips, also can be combined with PRF pulp, as well as with various combinations of PRF pulp, ONP pulp and OMG pulp, to produce a pulp mixture that is useful for producing newsprint-quality products. As used herein, "newsprint quality products" refers to products having a brightness of about 60±2 ISO. Working embodiments of the present invention have produced newsprint using a pulp mixture comprising about 40% pulp produced from recycled materials, and about 60% pulp produced from wood chips. Preferably, the 40% fraction will be derived substantially completely from PRF. However, the present invention includes products produced from pulp, of which any portion of the 40% fraction is produced, from PRF.

The first-generation pulp (e.g. wood-chip pulp), OMG pulp and ONP pulp can be made using known techniques, or purchased from pulp-producing mills. PRF for producing pulp can be obtained from two sources. PRF can be obtained directly from a recycling plant before it is disposed of in a landfill. PRF also can be obtained from landfills. PRF contains a high percentage of water, and when obtained and transported from a landfill can involve high transportation costs. Despite these transportation cost disadvantages, processing PRF from a landfill into an acceptable pulp is still much less expensive than processing OMG and ONP because PRF currently costs only about $20/ton, whereas ONP and OMG each cost about $175/ton.

The composition of PRF varies, depending on where it is obtained. PRF generally includes inks, fillers and higher concentrations of heavy metals than first-generation pulp and paper-mill sludge. PRF obtained from a landfill also may include dirt, rocks, glass and other contaminants.

B. Cellulosic Slurries

Once the PRF is obtained, it is then batch conveyed to a conventional pulper. The consistency of the pulp (the amount of water) is then adjusted. For instance, if PRF is being processed with either ONP or OMG, then the consistency should be from about ten (for ONP and PRF) to about 15 (OMG and PRF) percent by weight. Various chemicals, as discussed below, are then added to the pulper in order to process the PRF into pulp.

C. Pulper Chemistry

1. Caustic

A caustic material is added to the slurry comprising PRF in the pulper. The preferred caustic material is sodium hydroxide, although other caustics now known or hereinafter developed for use with cellulosic material also may be used, such as potassium hydroxide. Caustic swells the cellulosic fibers, and helps remove the ink particles, which are then dislodged from the cellulosic material by the physical scrubbing action of the pulper. If sodium hydroxide is used as the caustic for processing mixtures of ONP and PRF, or mixtures of OMG and PRF, then from about 0.5 weight percent to about 1.2 weight percent, preferably at least 1.0 weight percent, caustic is used. PRF is cellulosic material that has already been pulped, and hence lower amounts of caustic are required. It currently is believed that virtually no caustic will be required to material comprising substantially completely PRF.

All percents stated herein are weight percents based on the bone-dry weight of the fibers placed in the pulper. To determine the bone-dry weight, the amount of water associated with a particular source of cellulosic fibers is monitored over a period of time. Each source of material is then assumed to have the previously measured water content for purposes of determining the amount of chemicals added to the pulper. More specifically, ONP and OMG generally comprise about 90 percent water by weight. The water content of PRF has been determined by oven-drying the material, and then determining the weight difference between the raw PRF and the oven-dried PRF, such difference being attributable to water. PRF generally comprises about 35 percent water by weight.

2. Bleaching Agent

Bleaching agents also are added to the pulper to obtain end-products having acceptable brightness values, such as 60±2 ISO for newsprint. Any bleaching agent now known or hereinafter developed for bleaching cellulosic material likely can be used to practice the present invention. The amount of bleaching agent used should be from about 0.5 to about 1.3 weight percent. Working embodiments of the invention have used about 1 weight percent hydrogen peroxide as the bleaching agent for processing pulp mixtures containing PRF.

3. Sodium Silicate

Sodium silicate also generally is added to the pulper in amounts ranging from about 0.7 to about 1.2 weight percent, preferably about 1 weight percent. Sodium silicate is used for several reasons. First, the cellulosic material preferably is processed at a relatively stable pH of from about 8–10. Sodium silicate acts as a pH buffer within this pH range. PRF pulp also has increased concentrations of iron and magnesium, and sodium silicate weakly chelates these metals. Finally, sodium silicate acts as a dispersing agent to prevent ink particles from agglomerating after the particles are separated from the PRF.

4. Chelating Agents

A primary problem associated with processing PRF is the greater concentrations of heavy-metals that are contained therein relative to those found in ONP and OMG, the typical materials used to form paper products from post-consumer waste. More specifically, PRF has higher concentrations of aluminum, magnesium, manganese, chromium and iron than other recycled materials. Conventional chelating agents, such as ethylenediaminetetraacetic acid (EDTA), cannot effectively chelate the heavy metals, particularly at the concentrations found in PRF. EDTA also tends to react with hydrogen peroxide, which reduces its effectiveness as a chelating agent. Therefore, chelating agents other than EDTA have been used for processing PRF.

There likely are a number of chelating agents that will work for practicing the invention, and these chelating agents are best selected by considering the particular heavy metals and concentrations thereof that are present in the PRF being processed. Any chelating agent now known or hereinafter developed that chelates the particular heavy metals found in PRF can be used to practice the present invention, as long as such chelating agents do not adversely effect the processing of PRF into an acceptable pulp. Examples of chelating agents useful for practicing the invention include without limitation:

(1) aminocarboxylic acids, such as diethylenetriaminepentaacetic acid;
(2) salts of aminocarboxylic acids, such as the sodium salts of dietheylenetriaminepentaacetic acid;
(3) hydroxycarboxylic acids, such as citric acid, gluconic acid or glucoheptonic acid;
(4) salts of hydroxycarboxylic acids, such as the sodium salts of citric acid, gluconic acid and glucoheptonic acid;
(5) aminophosphonic acids, such as aminotri (methylenephosphonic acid); and
(6) salts of aminophosphonic acids, such as the sodium salt of aminotri(methylenephosphonic acid); and mixtures of these chelating agents.

A chelating agent that has worked satisfactorily for practicing a working embodiment of the present invention is diethylenetriaminepentaacetic acid (DTPA) and/or its sodium salts.

The amount of the chelating agent used is best determined by considering factors that would effect the amount of chelating agent required. However, a guiding principle is that the amount of chelating agent used has to be increased relative to that used for processing OMG and ONP. Working embodiments of the process have produced suitable PRF pulp using anywhere from about 0.3 to about 1.3 weight percent chelating agent. The amount of chelating agent used depends upon the portion of the pulp in the pulper that is PRF. For certain working embodiments, about 23% of the recycled fiber fraction used in the production of newsprint was produced from PRF. For products of this nature, about 0.6 weight percent DTPA works effectively. For processing cellulosic mixtures comprising substantially completely PRF the DTPA concentration must be increased up to about 1.3 weight percent.

5. Deinking Surfactant Chemicals

PRF obtained from a landfill contains fillers and inks. The inks must be removed, and can be removed using a combination of deinking chemicals and pressurized deinking modules. There likely are a number of deinking chemicals that can be used to practice the present invention. Any deinking chemical, now known or hereinafter developed, can be used as long as it results in producing a PRF pulp having acceptable qualities. There also are several classes of deinking chemicals that can be used to practice the invention, including without limitation: washing-out deinkers, such as Lion Industries 777, from Lions Industries, Inc., of Vancouver, Washington; nonionic surfactants, including Lion Industries 779, and LIPTOL S 100; and fatty acids, such as OLIONAR 4010 and SERAFAX 100 B.

Nonionic deinking chemicals, particularly LIPTOL S 100, have been used to practice working embodiments of the present invention. Although the fatty-acid deinking chemicals are cheaper, they leave deposits on the paper-making machinery. Washing-out deinkers are preferred where no deinking modules are used.

6. Biocides for Catalase-Producing Microorganisms

PRF has been found to include microorganisms that cannot be included in the end product. Most of these microorganisms are catalase-producing organisms that produce catalase upon exposure to hydrogen peroxide in the pulper. Biocides effective against such microorganisms therefore also can be added to the pulper. There also are other ways to eradicate microorganisms. For instance, the PRF pulp may be treated with sodium hypochlorite, or the processing temperature may be increased to 150° F. or greater.

D. Pulper Processing and Purging

The aqueous composition comprising PRF and the chemicals discussed above is processed in the pulper. One example of a pulper suitable for this purpose can be obtained from Beloit, Inc. of Massachusetts (Beloit). The aqueous composition is processed in the pulper for a period of time, referred to as the slush time, of from about ten to about thirty minutes. Working embodiments have slushed ONP and PRF for about 18 minutes, and OMG and PRF for about 22 minutes. By way of comparison, the slush time for processing ONP and OMG alone is about 25 minutes. Thus, the slush time for processing PRF into PRF pulp is decreased relative to the slush times required for pulping conventional sources of cellulosic material.

Pulp processed in the pulper is purged through a Belpurge, which also was obtained from Beloit. The Belpurge is a large trash screening device that removes particles from the pulp that are larger than about ⅜inch.

E. Pulp Storage and Pulp Blend Chests

PRF can be processed separately in the pulper. Alternatively, PRF can be processed with other sources of cellulosic material, such as ONP and OMG. ONP and PRF are processed separately from OMG and PRF. The pulps made from these different fiber sources may be combined to produce a pulp mixture containing PRF that is used for making cellulosic products. For example, OMG and PRF can be processed in the pulper and then discharged through the Belpurge and into an OMG/PRF storage chest. This also is true for ONP and PRF. Once sufficient amounts of pulp are stored in the chests, various pulp mixtures may be formed comprising PRF, OMG and ONP by blending pulp materials stored in the chests.

The pulp chests used in a working embodiment of the present invention were manufactured on site. The pulp chests comprise tile-lined storage bins that are equipped with agitators made by Beloit.

To form the various pulp mixtures, appropriate amounts of each pulp are conveyed from the pulp chests to a blend chest. Working embodiments of the invention generally have formed pulp mixtures comprising about 70 percent ONP and PRF, and about 30 percent OMG and PRF. This ratio was selected to provide the desired characteristics in the end product, such as to provide a sufficient amount of Kraft fiber to obtain a product having an acceptable strength.

Moreover, the deinking process benefits by the addition of ash, which apparently aids ink floatation in subsequent processing steps. The ash is provided primarily by OMG. Currently, it is believed that the deinking process works best when the pulp mixture contains at least 15 percent OMG.

There also are throughput considerations. PRF currently cannot be conveyed to the pulper as quickly as OMG and ONP, primarily because OMG and ONP are handled by an automatic loading apparatus. Thus, the ratio stated above was selected to provide an acceptable pulp throughput to maintain pace with the production of cellulosic products by the paper mill.

F. High Density Cleaners

After exiting the blend chest, the consistency of the pulp mixture is adjusted to be relatively high, such as about 3 percent by weight. The pulp mixture is then conveyed to high-density (HD) cleaners, which remove high-density contaminants from the pulp mixture. As used herein, the phrase "high density" refers to materials having a density of greater than about 1.1. The primary purpose of the HD cleaners is to remove big and heavy objects, such as rocks, glass and staples. Working embodiments of the invention used plural, typically three, HD cleaners from Krebs, Inc. of California. The HD cleaners generally are arranged in parallel along the production line to increase the cellulosic throughput.

G. Coarse Screens

After the pulp mixture is cleaned in the HD cleaners, it is then conveyed to plural, serially coupled coarse screens that were obtained from Beloit. Three coarse screens have been used to practice a working embodiment of the invention, each of which spherical screen holes having a diameter of about 0.055 inch. The spherical holes are used to remove linear contaminants, such as string and plastic.

The coarse screens have a "cascade" arrangement. This means that the pulp mixture is first conveyed through a primary coarse screen. Certain fibers pass through the primary coarse screen, and are referred to as the "accepts". A portion of the accepts from the primary coarse screen is fed to a stuff box, which maintains a constant volume of material therein. The fibers not passing through to the stuff box from the primary coarse screen are then conveyed back to the blend chest. The accepts from the secondary coarse screen are conveyed to the stuff box and commingled with the accepts from the primary coarse screen. The rejects from the secondary coarse screen are conveyed to a tertiary coarse screen. The tertiary coarse screen accepts are introduced back to the primary coarse screen reject tank for recycling through the series of coarse screens.

H. Pressurized Deinking Modules

The pulp mixture, at a consistency of about 0.9%, is conveyed from the stuff box to plural pressurized deinking modules obtained from Beloit. The pressurized deinking modules are coupled in series along the production line. A working embodiment of the present invention used four serially coupled pressurized deinking modules. The pressurized deinking modules operate to remove and aerate ink from the cellulosic material, thereby floating the ink on top of the aqueous mixture. This occurs because the ink has been separated from the cellulosic material by the deinking chemicals added to the pulper. The deinking modules preferably operate at a constant back pressure, which is provided by maintaining a constant volume of material in the stuff box.

The series of pressurized deinking modules do not entirely remove the ink particles from the cellulosic mixture. Instead, the brightness of the cellulosic material is monitored as it enters the first pressurized deinking module and as it exits the fourth pressurized deinking. This helps determine when the deinking process is complete. Typically, the brightness of the cellulosic material entering the first pressurized deinking module is about 45 ISO. The cellulosic material is processed in the serially coupled pressurized deinking modules until the material exiting the fourth pressurized deinking module has a brightness of about 50–52 ISO.

I. Primary Uniflow Cleaners

Cellulosic material passing through the pressurized deinking modules is conveyed to plural primary uniflow cleaners that were obtained from Beloit. The cellulosic material is processed in the primary uniflow cleaners at a consistency of about 0.8. Plural cleaners generally are used to process the cellulosic material, and these plural cleaners generally are coupled in parallel along the production line to provide an acceptable cellulosic throughput. The primary uniflow cleaners remove any material from the pulp mixtures having a density of less than about one. Thus, materials such as styrofoam are removed from the cellulosic material using the primary uniflow cleaners.

J. Primary Posiflow Cleaners

Cellulosic material passing through the primary uniflow cleaners is then pumped to a series of primary posiflow cleaners that were obtained from Beloit. As with the uniflow cleaners, a working embodiment of the present invention used plural posiflow cleaners arranged in parallel along the production line. The primary posiflow cleaners remove material from the pulp mixture having a density of greater than about one.

K. Fine Screens

After the pulp mixture is processed in the primary posiflow cleaners, it is then conveyed to plural fine screens, obtained from Beloit, that are serially coupled along the production line. Three screens, primary, secondary and tertiary screens, have been used to practice a working embodiment of the invention. The fine screens remove cubical and other non-linear contaminants from the cellulosic material. To screen the pulp mixtures discussed above, the primary screen had slot sizes of about 0.08 inch, and each of the secondary and tertiary fine screens had slot sizes of about 0.06 inch.

The slot sizes of the fine screens will be changed to screen pulp produced solely from PRF. More specifically, the slot size of the primary screen will be increased from about 0.08 inch to about 0.10 inch to process PRF. The slot sizes of the secondary and tertiary fine screens will be increased from about 0.06 inch for processing ONP and OMG, to about 0.08 inch for processing PRF. PRF generally includes longer (and hence stronger) fibers than are found in ONP and OMG. Thus, the slot sizes will have to be increased to process PRF in order to provide an acceptable cellulosic throughput.

The cellulosic material not rejected by the primary coarse screen is fed to a polydisk filter. The rejects from the primary fine screen are fed to a primary fine screen rejects tank. The material fed to the primary fine screens reject tank is then conveyed to the secondary fine screen. The material not rejected by the secondary fine screen is conveyed to the polydisk filter, and the rejects are fed to a secondary fine screen rejects tank. The material entering the secondary fine screen rejects tank is then conveyed to a tertiary fine screen. The accepts from the tertiary fine screen are then fed back to the primary fine and the rejects from the tertiary fine screen are discarded.

L. Polydisk Filter

The accepts from the primary and secondary fine screens are conveyed to a polydisk filter at a consistency of about 0.5%. The polydisk filter, which was obtained from Beloit, has two purposes. First, the polydisk filter washes fine ink particles, i.e. particles smaller than about 50 microns, from the pulp mixtures. Second, the consistency of the pulp mixture is thickened in the polydisk filter to be about 8 percent.

M. Pulp Presses

The pulp mixture exiting the polydisk filter has received its final screening in the plural clean and screen processes discussed above. The consistency of the material exiting the polydisk filter is about 8 percent, which is too low for processing the cellulosic pulp mixture into products. The consistency must be increased to be from about fifteen to about thirty percent to produce cellulosic products. This can be done using cellulosic presses. Presses suitable for practicing the present invention can be obtained from the Andritz Sproat-Bauer Company. Both pulp screw presses and twin wire presses have been used in a working embodiment of the present invention. To obtain an acceptable throughput, a working embodiment used two pulp screw presses, and one twin wire press, coupled in parallel along the production line, to produce pulp mixtures having consistencies of from about twenty percent to about thirty percent.

The cellulosic presses also have other purposes. For instance, the presses help remove from the cellulosic material processing water that cannot be conveyed to the paper mills. Second, the presses help squeeze out ink particles that have not been removed by previous procedures.

N. Steaming Tube and Diskperser

After the consistency of the pulp mixture has been adjusted using the pulp presses, the pulp mixture is then conveyed to a steaming tube. The steaming tube is a cylindrical storage tube having steam inlets. The steaming tube is used to raise the temperature of the pulp mixture from about 110° F. to about 150° F.–180° F. The purpose of raising the temperature is to fluidize any solid contaminants that may still be present in the pulp mixture, such as toners, inks and sticky materials.

The pulp mixture is conveyed from the steaming tube to a diskperser, which was obtained from Beloit. The diskperser helps disperse the materials that are fluidized in the steaming tube.

O. Bleach-Feed Standpipe

Because brightness is important for producing newsprint, the pulp mixture may now undergo a second bleaching process. To bleach the pulp a second time, the pulp mixture is conveyed from the diskperser to a bleaching tower, which is a pulp storage bin that was manufactured on site. The pulp mixture is diluted to a consistency of about 11.5 percent, and then bleached with a bleaching agent, such as about 1 weight percent sodium hydrosulphite.

P. HD Tower

The pulp mixture bleached in the bleaching tower can now be used to produce cellulosic products at a paper or board mill. In working embodiments, the pulp mixture was stored in an HD tower, manufactured on site, prior to being conveyed to the paper mill for the production of newsprint.

The following examples are intended to be illustrative of the invention only, and should not be interpreted to limit the invention to the particular features discussed therein.

EXAMPLE 1

10,000 pounds of ONP and 18,000 pounds of PRF were conveyed to a pulper obtained from Beloit. The consistency of the cellulosic material was adjusted to be about 10.5 percent. An aqueous mixture was then formed in the pulper comprising, in addition to the above mentioned cellulosic material, (1) about 0.30 weight percent LIPTOL S 100, (2) about 1 weight percent DTPA, (3) about 1 weight percent hydrogen peroxide, (4) about 1 weight percent NaOH, and (5) about 1.2 weight percent sodium silicate. The aqueous pulp mixture was slushed in the pulper for about 18 minutes, and then conveyed through a Beloit Belpurge and into an ONP and PRF storage chest.

EXAMPLE 2

5,000 pounds of OMG, 6,000 pounds of mixed residential waste, and 18,000 pounds of PRF were conveyed to the pulper as in Example 1. The consistency of the cellulosic material was adjusted to be about 14 percent. An aqueous mixture was then formed in the pulper comprising, in addition to the above mentioned cellulosic material, (1) about 0.15 weight percent LIPTOL S 100, (2) about 0.5 weight percent DTPA, (3) about 0.5 weight percent hydrogen peroxide, (4) about 0.5 weight percent NaOH, and (5) about 0.6 weight percent sodium silicate. The aqueous pulp mixture was then slushed in the pulper for about 22 minutes, and then conveyed through the Belpurge and into an OMG and PRF storage chest.

EXAMPLE 3

This example describes a process that may be used for processing PRF into pulp. 28,000 pounds of PRF are conveyed to the pulper. An aqueous mixture is then formed comprising, in addition to the PRF, (1) about 0.2 weight percent LIPTOL S 100 and (2) about 1.25 weight percent DTPA. The aqueous pulp mixture is then slushed in the pulper for about 10 minutes, and then conveyed through the Belpurge and into an PRF storage chest.

After the pulp has been produced as discussed above, it is then used to make cellulosic products, particularly newsprint, using techniques known in the art. Moreover, PRF can be substituted for virgin Kraft pulp to make products generally made from Kraft pulp.

Having illustrated and described the principles of the present invention in several currently preferred embodiments, it should be apparent to those skilled in the art that the invention can be modified in arrangement and detail without departing from such principles. We claim all modifications coming within the spirit and scope of the following claims.

We claim:

1. A method for making a cellulosic pulp comprising cellulosic fibers from recycling mill sludge produced by another mill, the method comprising the steps of:
   providing recycling mill sludge comprising cellulosic fibers, ink, and a heavy metal;
   adding water and at least one chelating agent to the recycling mill sludge, wherein the chelating agent chelates the heavy metal in the recycling mill sludge, thereby producing an aqueous composition having a consistency that is suitable for processing in a pulper; and
   processing the aqueous composition in the pulper for a period of time sufficient to form a pulp comprising the cellulosic fibers from the recycling mill sludge.

2. The method according to claim 1 wherein the aqueous composition comprises from about 0 to about 1.25 weight percent caustic agent, at least 1 weight percent bleaching agent and at least 1.2 weight percent chelating agent.

3. The method according to claim 2 wherein the aqueous composition further comprises a deinking agent.

4. The method according to claim 2 wherein the chelating agent is selected from the group consisting of aminocarboxylic acids, salts of aminocarboxylic acids, hydroxycarboxylic acids, salts of hydroxycarboxylic acids, aminophosphonic acids, salts of aminophosphonic acids, and mixtures thereof.

5. The method according to claim 2 wherein the caustic is sodium hydroxide and the bleaching agent is hydrogen peroxide.

6. The method according to claim 2 wherein the chelating agent is diethylenetriaminepentacetic acid.

7. The method according to claim 2 wherein the aqueous mixture further comprises sodium silicate.

8. The method according to claim 1 wherein the aqueous composition further comprises a cellulosic material selected from the group consisting of old magazines, old newspapers, and mixtures thereof.

9. The method according to claim 1 wherein at least some of the recycling mill sludge is obtained from a landfill.

10. The method according to claim 1 wherein the aqueous composition further comprises at least one member of the group consisting of a bleaching agent, a caustic agent, and a deinking agent.

11. The method according to claim 1 wherein the aqueous composition further comprises a bleaching agent and a caustic agent.

12. The method according to claim 11 wherein the aqueous composition further comprises a deinking agent.

13. A method for forming cellulosic pulp comprising cellulosic fibers from recycling mill sludge produced by another mill, the method comprising:
   forming an aqueous composition comprising (i) recycling mill sludge comprising cellulosic fibers, ink, and a heavy metal, (ii) from about 0 to about 1.25 weight percent of a caustic agent, (iii) from about 0.75 to about 1.25 weight percent bleaching agent, (iv) from about 0.75 to about 1.25 weight percent of a deinking agent, (v) from about 0.6 to about 1.5 weight percent of a chelating agent selected from the group consisting of aminocarboxylic acids, salts of aminocarboxylic acids, hydroxycarboxylic acids, salts of hydroxycarboxylic acids, aminophosphonic acids, salts of aminophosphonic acids, and mixtures thereof, and (vi) water sufficient to produce a consistency that is suitable for processing in a pulper; and
   processing the aqueous composition in the pulper for a period of time sufficient to form a pulp comprising the cellulosic fibers from the recycling mill sludge that is suitable for production of a cellulosic product.

14. The method according to claim 13 and further comprising the steps of:
   cleaning the pulp;
   screening the pulp; and
   adding or removing water from the pulp to obtain a pulp consistency suitable for forming cellulosic products.

15. The method according to claim 13 wherein the caustic is sodium hydroxide and the bleaching agent is hydrogen peroxide.

16. The method according to claim 13 wherein the chelating agent is diethylenetriaminepentacetic acid.

17. A method for producing cellulosic products, comprising:
   providing recycling mill sludge comprising cellulosic fibers, ink, and a heavy metal;
   adding water and a chelating agent to the recycling mill sludge, thereby producing an aqueous composition having a consistency that is suitable for processing in a pulper;
   processing the aqueous composition in the pulper for a period of time sufficient to form a cellulosic pulp comprising the cellulosic fibers from the recycling mill sludge, wherein the recycling mill sludge and the pulp are produced in different mills; and
   forming a cellulosic product that comprises the pulp.

18. The method according to claim 17 wherein the cellulosic product is newsprint having a brightness of at least 58 ISO.

19. The method according to claim 17 wherein the aqueous composition further comprises a caustic agent and a bleaching agent.

20. The method according to claim 19 wherein the chelating agent is selected from the group consisting of aminocarboxylic acids, salts of aminocarboxylic acids, hydroxycarboxylic acids, salts of hydroxycarboxylic acids, aminophosphonic acids, salts of aminophosphonic acids, and mixtures thereof.

21. The method according to 19 wherein the chelating agent is diethylenetriaminepentacetic acid.

22. The method according to claim 17 wherein at least about 40 percent by weight of cellulosic fibers in the pulp are from the recycling mill sludge.

23. The method according to claim 22 wherein any remaining portion of the cellulosic fibers in the pulp are from post-consumer recycled material.

24. The method according to claim 22 wherein substantially all of the cellulosic fibers in the pulp are from the recycling mill sludge.

25. The method according to claim 17 wherein the aqueous composition further comprises a cellulosic material obtained from a material selected from the group consisting of old newspapers, old magazines, and mixtures thereof.

26. The method according to claim 17 and, prior to the step of forming a cellulosic product, further comprising:
   processing old magazines and the recycling mill sludge to form an old magazine pulp;
   processing old newspapers and the recycling mill sludge to form an old newspaper pulp; and
   blending the old magazine pulp and the old newspaper pulp to form the cellulosic pulp, wherein at least about 40 percent by weight of cellulosic fibers in the cellulosic pulp are from the recycling mill sludge.

27. The method according to claim 26 wherein the step of blending further comprises blending virgin pulp with the old magazine pulp and the old newspaper pulp.

28. The method according to claim 17 wherein at least 1.0 weight percent hydrogen peroxide is used as the bleaching agent based on the bone-dry weight of cellulosic material added to the pulper.

29. The method according to claim 17 wherein at least 1.0 weight percent hydrogen peroxide is used as the bleaching agent based on the bone-dry weight of cellulosic material added to the pulper.

30. The method according to claim 17 wherein at least some of the sludge is obtained from a landfill.

31. A method for producing cellulosic products, comprising:
   forming an aqueous composition in a pulper comprising a recycling mill sludge, a caustic agent, a bleaching agent, a chelating agent, wherein the chelating agent chelates the heavy metal in the recycling mill sludge a deinking agent, and sufficient water to produce a consistency that is suitable for processing in the pulper, wherein the recycling mill sludge comprises cellulosic fibers, ink, and a heavy metal;
   processing the aqueous composition in the pulper for a period of time sufficient to form a pulp comprising the cellulosic fibers from the recycling mill sludge, wherein the recycling mill sludge and the pulp are produced in different mills;
   forming a pulp mixture, the mixture comprising pulp produced from materials selected from the group consisting of old magazines, old newspapers, virgin pulp, and mixtures thereof, wherein at least about 40 percent by weight of cellulosic fibers in the pulp mixture are from the recycling mill sludge; and
   forming the pulp mixture into a cellulosic product.

32. The method according to claim 31 wherein the caustic is sodium hydroxide, and wherein at least 1.0 weight percent sodium hydroxide is added to the pulper based on the bone-dry weight of cellulosic material added to the pulper.

33. The method according to claim 31 wherein the bleaching agent is hydrogen peroxide, and wherein at least 1.0 weight percent hydrogen peroxide is added to the pulper based on the bone-dry weight of cellulosic material added to the pulper.

34. The method according to claim 31 wherein the chelating agent is selected from the group consisting of aminocarboxylic acids, salts of aminocarboxylic acids, hydroxycarboxylic acids, salts of hydroxycarboxylic acids, aminophosphonic acids, salts of aminophosphonic acids, and mixtures thereof.

35. The method according to 31 wherein the chelating agent is diethylenetriaminepentacetic acid.

36. The method according to claim 31 wherein the pulp mixture is formed by blending a first pulp mixture comprising pulp derived from old newspapers and the cellulosic fibers from the recycling mill sludge with a second pulp mixture comprising pulp derived from old magazines and the cellulosic fibers from the recycling mill sludge.

37. The method according to claim 36 wherein the first pulp mixture and the second pulp mixture are stored in separate pulp chests after pulping and prior to blending.

38. A method for producing cellulosic products, comprising:
   forming an aqueous composition in a pulper comprising a recycling mill sludge comprising cellulosic fibers, ink, and a heavy metal, about 1 weight percent sodium hydroxide, about 1 weight percent hydrogen peroxide, about 1 weight percent of a deinking agent, a chelating agent in an amount sufficient to chelate substantially all of the heavy metals present in the recycling mill sludge, the chelating agent being selected from the group consisting of aminocarboxylic acids, salts of aminocarboxylic acids, hydroxycarboxylic acids, salts of hydroxycarboxylic acids, aminophosphonic acids, salts of aminophosphonic acids, and mixtures thereof, and sufficient water to produce a consistency suitable for processing in the pulper;
   processing the aqueous composition in the pulper for a period of time sufficient to form a pulp comprising the cellulosic fibers from the recycling mill sludge, wherein the recycling mill sludge and the pulp comprising the cellulosic fibers from the recycling mill sludge are produced in different mills;
   forming a pulp mixture, the pulp mixture comprising pulp produced from materials selected from the group consisting of old magazines, old newspapers, virgin pulp, and mixtures thereof, wherein at least about 40 weight percent of cellulosic fibers in the pulp mixture are from the recycling mill sludge; and
   forming the pulp mixture into cellulosic products.

39. A process for making a cellulosic pulp from recycling mill sludge produced by another mill, the process comprising the steps of:
   (a) providing recycling mill sludge comprising cellulosic fibers, ink, and a heavy metal;
   (b) adding to the recycling mill sludge water, a caustic agent, a bleaching agent, a chelating agent wherein the chelating chelates the heavy metal in the recycle mill sludge, and a deinking agent, thereby producing an aqueous composition having a consistency that is suitable for processing in a pulper; and
   (c) processing the aqueous composition in the pulper for a period of time sufficient to form a cellulosic pulp comprising the cellulosic fibers from the recycling mill sludge, wherein the pulp is suitable for production of newsprint.

40. The process according to claim 39 wherein the aqueous composition comprises from about 0 to about 1.25 weight percent caustic agent, at least 1 weight percent bleaching agent, and at least 1.2 weight percent chelating agent.

* * * * *